(12) United States Patent
Hosaka et al.

(10) Patent No.: US 8,831,233 B2
(45) Date of Patent: Sep. 9, 2014

(54) MONITORING APPARATUS AND METHOD (75) Inventors: Rika Hosaka, Yokohama (JP);
Kazushige Ouchi, Saitama (JP);
Kazunori Imoto, Kawasaki (JP);
Masaaki Kikuchi, Kawasaki (JP);
Koichi Ootomi, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 365 days.

(21) Appl. No.: 13/427,133

(22) Filed: Mar. 22, 2012

(65) Prior Publication Data
US 2012/0219157 A1 Aug. 30, 2012

Related U.S. Application Data
(63) Continuation of application No. PCT/JP2009/066827, filed on Sep. 28, 2009.

(51) Int. Cl.
*H04R 29/00* (2006.01)
*G01H 7/00* (2006.01)
*G01H 3/08* (2006.01)

(52) U.S. Cl.
CPC ... *G01H 7/00* (2013.01); *G01H 3/08* (2013.01)
USPC ............ 381/56; 381/58; 381/92; 381/122; 381/98

(58) Field of Classification Search
USPC ......... 381/56, 57, 58, 92, 100, 101, 102, 103, 381/120, 124; 700/94; 73/1.82, 584, 585, 73/586, 587, 648, 659, 661, 861.18
See application file for complete search history.

(56) References Cited

U.S. PATENT DOCUMENTS

| | | | | |
|---|---|---|---|---|
| 4,052,694 A | * | 10/1977 | Fredriksson | 367/177 |
| 4,425,798 A | * | 1/1984 | Nagai et al. | 73/659 |
| 5,473,315 A | * | 12/1995 | Holroyd | 340/683 |
| 6,370,252 B1 | * | 4/2002 | Lunter | 381/58 |
| 7,106,865 B2 | * | 9/2006 | Pavlov et al. | 381/59 |
| 2004/0015251 A1 | * | 1/2004 | Hamada et al. | 700/94 |

(Continued)

FOREIGN PATENT DOCUMENTS

| | | | | |
|---|---|---|---|---|
| JP | 10-288639 | * | 10/1998 | G01R 31/00 |
| JP | 10-288639 A | | 10/1998 | |

(Continued)

OTHER PUBLICATIONS
English translation of IPRP dated Apr. 19, 2012 from PCT/JP2009/066827; 7 pages.

(Continued)

*Primary Examiner* — Leshui Zhang
(74) *Attorney, Agent, or Firm* — Ohlandt, Greeley, Ruggiero & Perle, L.L.P.

(57) ABSTRACT

According to one embodiment, a monitoring apparatus includes an acquisition unit, an analysis unit, a calculation unit, a storage, a determination unit. The acquisition unit acquires an environmental sound. The analysis unit performs frequency analysis to extract characteristic frequency components. The calculation unit calculates first values of metrics. The storage stores contour data generated by second values of the metrics. The determination unit determines whether or not there is a first measurement point in which a first value and a second value match, if there is no first measurement point or the change is not less than the threshold value, determines that the machines is abnormal.

7 Claims, 8 Drawing Sheets

(56) References Cited

U.S. PATENT DOCUMENTS

| | | | |
|---|---|---|---|
| 2004/0136539 A1* | 7/2004 | Uhi et al. | 381/56 |
| 2009/0304195 A1* | 12/2009 | Fillol | 381/59 |
| 2010/0008512 A1* | 1/2010 | Packer et al. | 381/57 |

FOREIGN PATENT DOCUMENTS

| | | | | |
|---|---|---|---|---|
| JP | 11-064089 | * | 3/1999 | G01H 3/00 |
| JP | 11-064089 | A | 3/1999 | |
| JP | 2002-107223 | A | 4/2002 | |
| JP | 2003-279403 | A | 10/2003 | |
| JP | 2008-033752 | A | 2/2008 | |
| JP | 2008-268176 | A | 11/2008 | |

OTHER PUBLICATIONS

International Search Report dated Dec. 15, 2009 from PCT/JP2009/066827.

* cited by examiner

MONITORING APPARATUS AND METHOD

CROSS REFERENCE TO RELATED APPLICATIONS

This application is a Continuation Application of PCT Application No. PCT/JP2009/066827, filed Sep. 28, 2009, the entire contents of which are incorporated herein by reference.

FIELD

Embodiments described herein relate generally to a monitoring apparatus and method.

BACKGROUND

Examples of technique for examining the operational state of a machine on the basis of acoustic information includes a technique for performing examination by analyzing information given by a microphone installed in proximity to a machine to be monitored (See, e.g., JP-A 2003-279403 (KOKAI)). Another example includes a technique for using a non-fixed acoustic sensor such as a microphone provided in a cellular phone (See, e.g., JP-A 2008-33752 (KOKAI)).

DETAILED DESCRIPTION

If microphones are fixed and installed, a plurality of microphones are required. In a method using an acoustic sensor that is not fixed, the acoustic sensor can detect only an abnormal sound of a particular frequency registered in advance in a machine, such as an alarm bell connected to a fire detector, and a warning speaker sound connected to an intrusion sensor.

In general, according to one embodiment, a monitoring apparatus includes an acquisition unit, an analysis unit, a calculation unit, a storage, a determination unit. The acquisition unit is configured to acquire an environmental sound in measurement points within a space in which one or more machines to be measured are present. The analysis unit is configured to perform frequency analysis by sampling the environmental sound, to extract characteristic frequency components of the machines, each of the characteristic frequency components are a frequency component with the highest sound pressure level in frequency components included in operating sounds of the machines. The calculation unit is configured to calculate first values of metrics in the measurement points based on the sound pressure levels of the characteristic frequency components, the metrics indicate at least one index for determining difference of sound quality. The storage stores contour data items generated by connecting second values of the metrics in the measurement points, the second values are pre-calculated according to operational states of the machines. The determination unit is configured to determine whether or not there is a first measurement point in which the first value and the second value match, if there is the first measurement point and change of the first value is less than a threshold value, to determine that the operational state of the machines is normal, if there is no first measurement point or the change is not less than the threshold value, to determine that the operational state of at least one of the machines is abnormal, and if the first value stays constant for a certain period, to determine that at least one of a user and the machine is abnormal.

In the following, the monitoring apparatus and method according to the present embodiments will be described in details with reference to the drawings. In the embodiments described below, elements specified by the same reference number carry out the same operation, and a repetitive description of such elements will be omitted.

First Embodiment

For example, a monitoring apparatus according to the present embodiment is assumed to be used to inspect (observe) the state of a machine operating in a factory or a building while the user moves.

Figure 1:
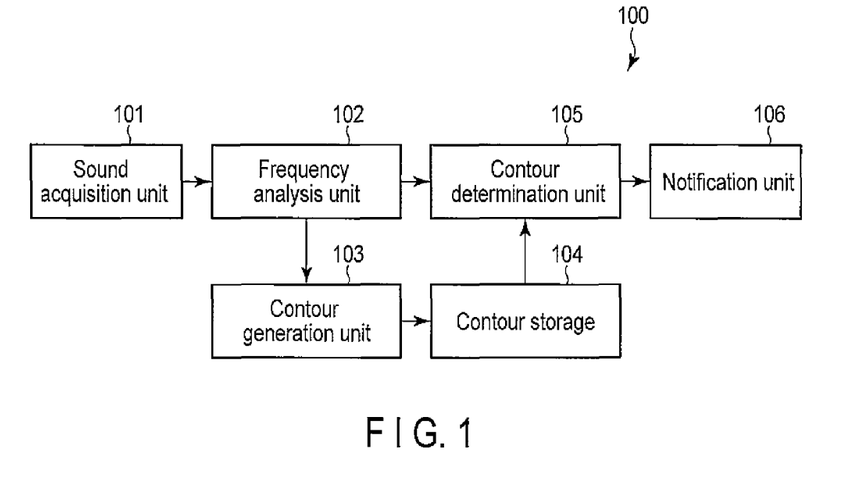
FIG. 1 is a block diagram illustrating a configuration of a monitoring apparatus according to a first embodiment.

The monitoring apparatus according to the first embodiment will be explained in detail with reference to FIG. 1.

The monitoring apparatus 100 according to the first embodiment includes a sound acquisition unit 101, a frequency analysis unit 102, a contour generation unit 103, a contour storage 104, a contour determination unit 105, and a notification unit 106.

The sound acquisition unit 101 acquires environmental sound at any measuring point in an environment including machines to be measured (also referred to as a measurement space) using an acoustic sensor such as a microphone.

The frequency analysis unit 102 receives the environmental sound from the sound acquisition unit 101, and performs frequency analysis of the environmental sound. Then, a characteristic frequency component which is a frequency component unique to each machine, is extracted.

The contour generation unit 103 receives the characteristic frequency component for each machine from the frequency analysis unit 102, and based on the sound pressure level of the characteristic frequency, the contour generation unit 103 generates a contour figure (also referred to as contour data items) in which measuring points having the same sound pressure level are connected if the machines are operating independently. Further, the contour generation unit 103 generates contour figures (hereinafter referred to as basic data items) of sound pressure levels of all combinations including a case where machines are operating and a case where machines are not operating. The basic data items will be explained later in detail with reference to FIG. 4.

The contour storage 104 receives the basic data items from the contour generation unit 103, and stores the basic data items.

The contour determination unit 105 receives the characteristic frequency components from the frequency analysis unit 102, and receives the contour figures included in the basic data items from the contour storage 104. The contour determination unit 105 calculates determination result by determining whether or not the sound pressure level of each characteristic frequency component (also referred to as first value of the sound pressure level) matches the sound pressure level of each characteristic frequency component (also referred to as second value of the sound pressure level) in the contour figure of the basic data item.

The notification unit 106 receives the determination result from the contour determination unit 105, and notifies the determination result to the user or another external system.

Subsequently, the operation of basic data generation by the monitoring apparatus according to the present embodiment will be explained in detail with reference to the flowchart of FIG. 2.

In step S201, the sound acquisition unit 101 acquires operating sound obtained if each machine is operating normally. More specifically, after each machine installed within the measurement space is caused to operate independently, an environmental sound including the operating sound of the machine is acquired at any measuring point set in the measurement space.

In step S202, frequency analysis such as fast Fourier transformation is performed on the environmental sound acquired by the frequency analysis unit 102.

In step S203, the frequency analysis unit 102 extracts the characteristic frequency component for each machine. Since each machine is caused to operate independently, the characteristic frequency component of the operating sound unique to the machine can be extracted.

In step S204, on the basis of the sound pressure level of the characteristic frequency component at each measuring point, the contour generation unit 103 generates a contour figure in which the points of the sound pressure level of which characteristic frequency component is the same are connected if each machine is caused to operate independently. Then, the contour figures of the respective machines are overlaid, i.e., a summation of sound pressure levels of all the characteristic frequency components is obtained at each measuring point, so that a contour figure is generated.

In step S205, the contour figure generated by the contour generation unit 103 is stored to the contour storage 104 as basic data item. The operation of the basic data generation by the monitoring apparatus according to the first embodiment is finished.

Subsequently, specific example of processing from steps S201 to S204 will be explained in detail with reference to FIG. 3.

Figure 3:
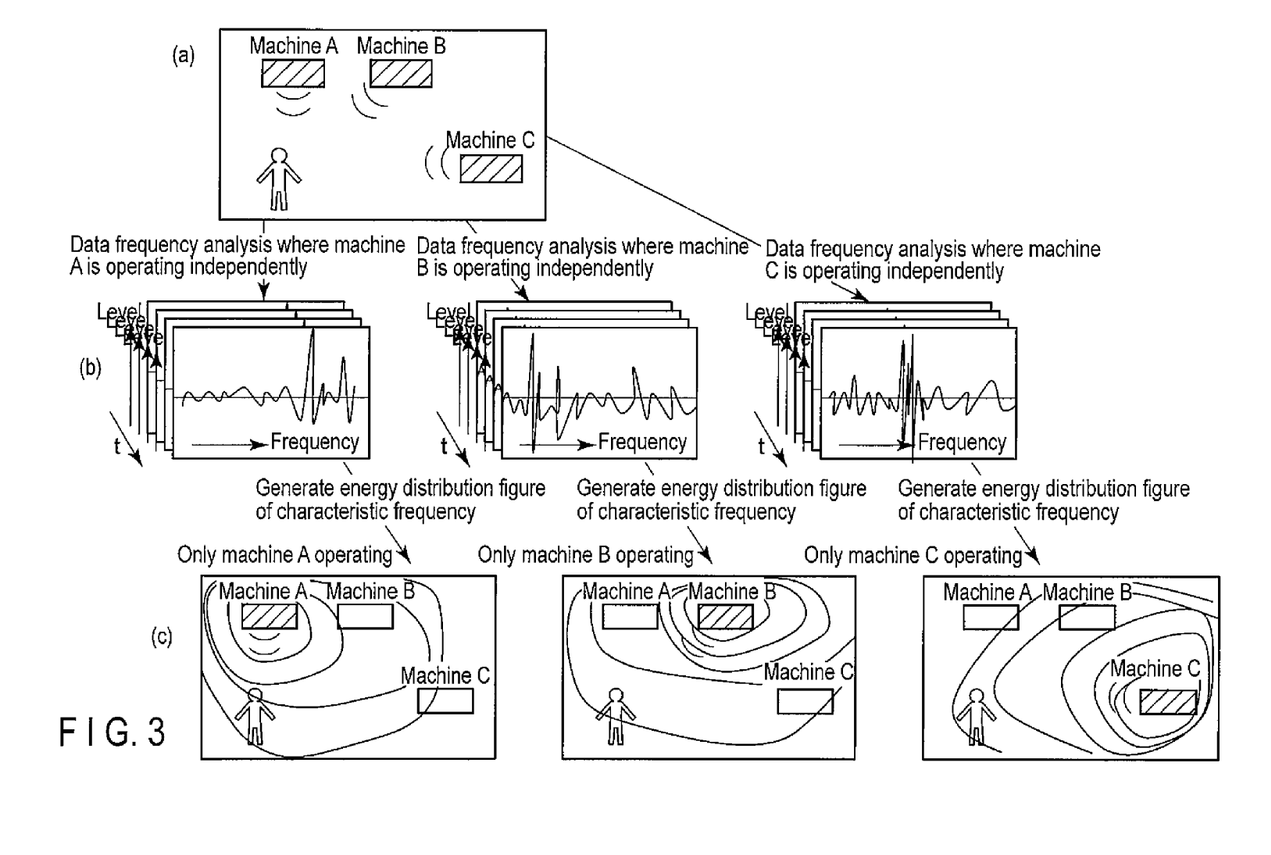
FIG. 3 is a diagram illustrating observation of machines to generation of contour figures.

In this case, as shown in FIG. 3(a), it is assumed that three machines, i.e., a machine A, a machine B, and a machine C, are operating within the measurement space. FIG. 3(b) shows relationship between the sound pressure level and the frequency, the relationship is a result obtained by sampling the environmental sound with a regular interval if each machine is caused to operate independently and thereafter performing fast Fourier transformation thereon. As shown in FIG. 3(b), a characteristic frequency component which is different for each machine can be obtained.

FIG. 3(c) illustrates contour figures generated based on the sound pressure level of the characteristic frequency component of each machine. The contour figures of machine A, machine B, and machine C can be respectively generated by connecting measuring points of the same sound pressure level of the characteristic frequency component.

In this case, an example of basic data generation will be explained in detail with reference to FIG. 4.

Figure 4:
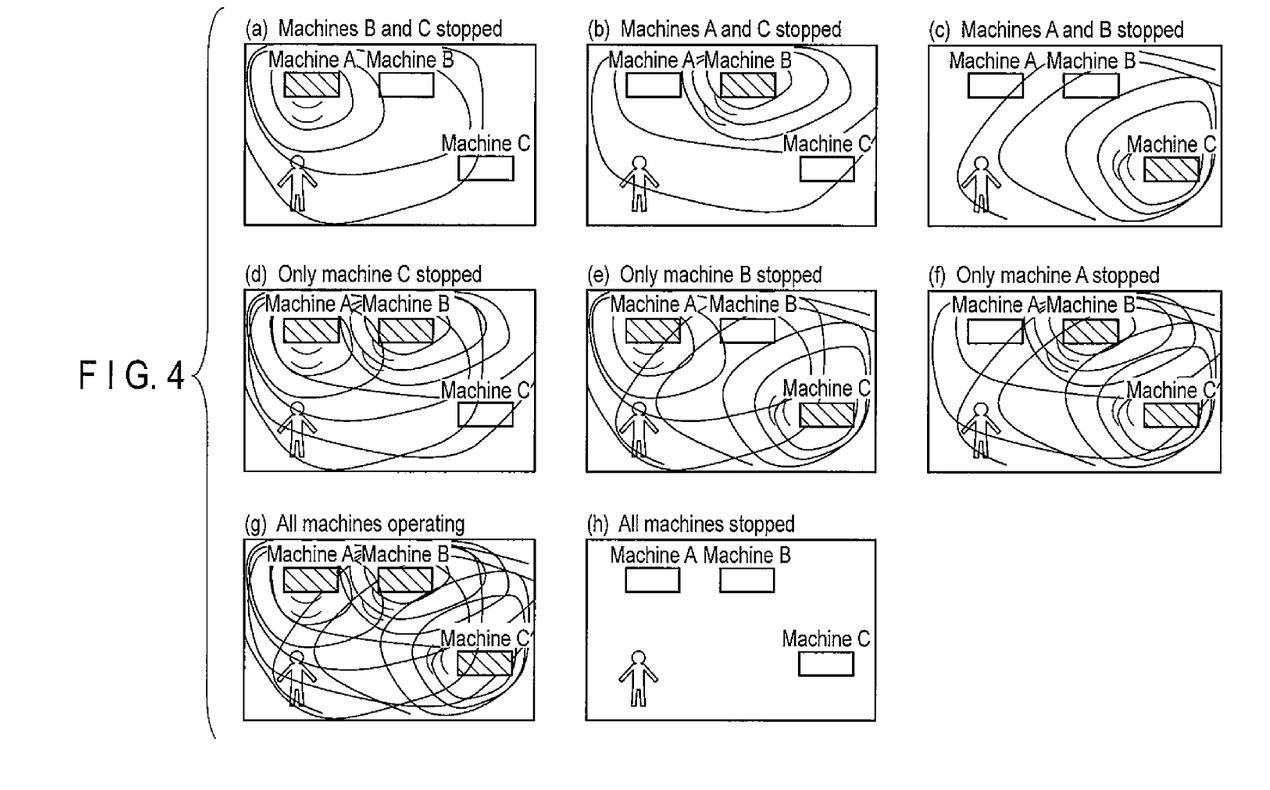
FIG. 4 is a diagram illustrating an example of basic data item.

FIG. 4(a), FIG. 4(b), and FIG. 4(c) are contour figures respectively illustrating the states where machine A, machine B, and machine C are operating independently, which are similar to the figures as shown in FIG. 3(C).

FIG. 4(d), FIG. 4(e), and FIG. 4(f) respectively illustrate the states where machine C, machine B, and machine A are stopped. The contour figures on this occasion are generated by calculating a summation of the characteristic frequency components of the respective machines since the two machines are operating.

More specifically, in this case, it is assumed that the characteristic frequency component of machine A is 100 Hz, the characteristic frequency component of machine B is 500 Hz, and the characteristic frequency component of machine C is 700 Hz. In the example of FIG. 4(d), a summation of the frequency component of 100 Hz obtained if machine A is caused to operate independently and the component of 100 Hz obtained if machine B is caused to operate independently are calculated at each measuring point, which may be adopted as the characteristic frequency component of machine A if two machines, i.e., machine A and machine B, are caused to operate. Likewise, in the example of FIG. 4F, the characteristic frequency component (500 Hz) of machine B can be obtained by calculating a summation of the frequency component of 500 Hz obtained if machine B is caused to operate independently and the component of 500 Hz obtained if machine C is caused to operate independently.

FIG. 4(g) is a contour figure obtained if all of the three machines are caused to operate. FIG. 4(g) can be calculated according to the same method as the method according to which the contour figures from FIG. 4(d) to FIG. 4(f) are calculated in which two machines are operating. On the other hand, FIG. 4(h) illustrates a state in which none of the machines is operating.

As described above, the contour figures of all the combinations of the machines to be measured as basic data items are obtained and stored to the contour storage 104 in advance. In the example of FIG. 4(a) to FIG. 4(h), there are three machines. Therefore, the number of all the combinations of operation/stop of the machines is $2^3=8$. In other words, the number of machines to be measured is n (n is a positive integer), $2^n$ contour figures may be generated.

The basic data items may be measured and generated by a separate sound acquisition machine in advance, and the basic data items may be stored to the contour storage 104. In this case, the contour generation unit included in the monitoring apparatus may be omitted.

Figure 5:
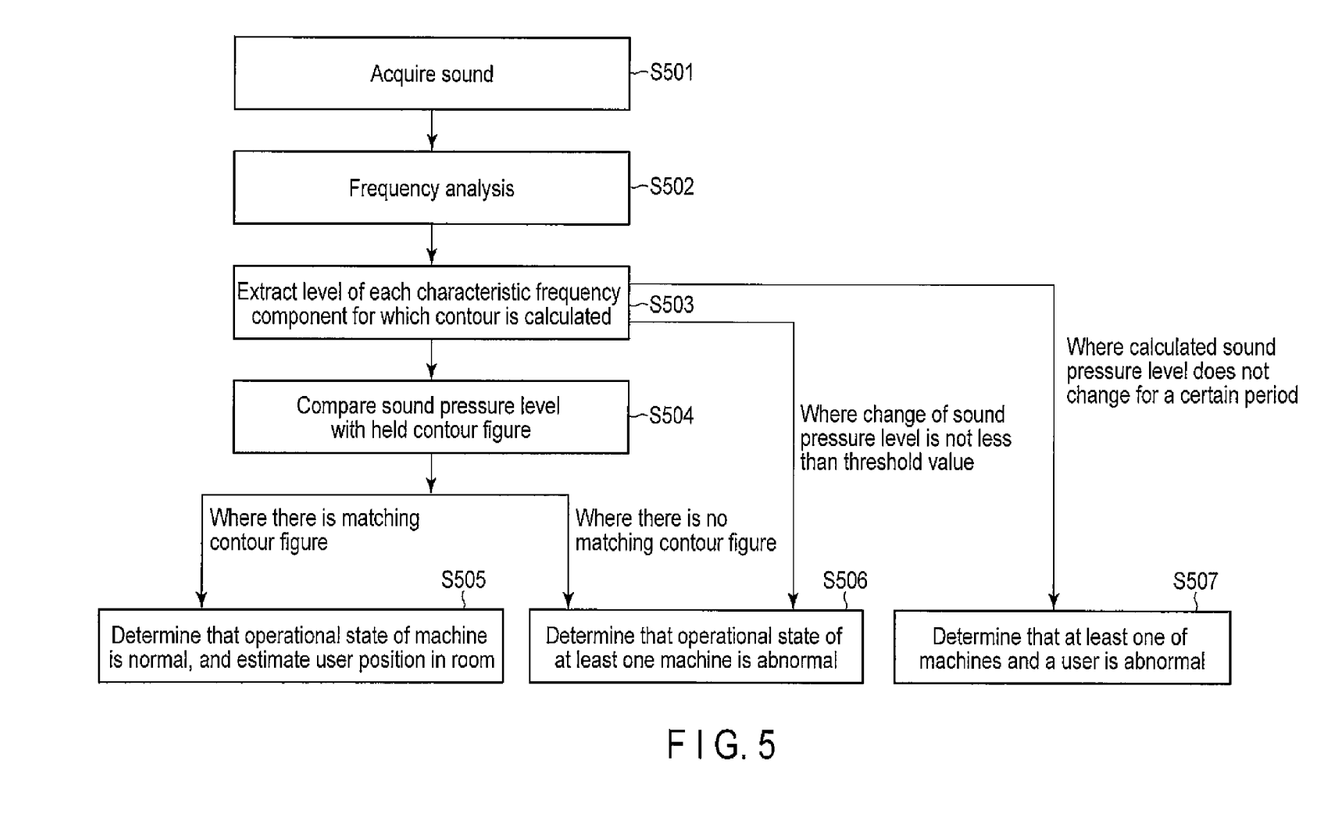
FIG. 5 is a flowchart illustrating observation operation of the monitoring apparatus according to the first embodiment.

Subsequently, observation operation of the monitoring apparatus according to the first embodiment will be explained in detail with reference to the flowchart of FIG. 5.

In step S501 and step S502, the same operations as those of step S201 and step S202 are performed.

In step S503, the frequency analysis unit 102 extracts the level of the characteristic frequency component of each machine from the acquired sound. For example, in the example of the machine as shown in FIG. 4, the sound pressure levels of the characteristic frequency components of 100 Hz, 500 Hz, and 700 Hz may be extracted. If change of the sound pressure level of the characteristic frequency component is greater than or equal to a threshold value, step S506 is performed, and if the calculated sound pressure level does not change for a certain period, step S507 is subsequently performed. In other cases, step S504 is subsequently performed.

In step S504, the contour determination unit 105 compares the sound pressure level extracted in step S503 with the sound pressure level for each characteristic frequency component at each measuring point of the contour figure stored in the contour storage 104. If there is a corresponding contour figure, step S505 is subsequently performed, and if there is no contour figure, step S506 is subsequently performed.

In step S505, the contour determination unit 105 determines that the operational state of the machine is a normal state. If there is a contour figure including a measuring point matching the extracted sound pressure level, the position of the measuring point is already known in the measurement space, and therefore, the position of the user can be estimated.

In step S506, there is no contour figure having the same sound pressure level and characteristic frequency component observed, and therefore, this indicates that any one of the machines is different from the normal operational state. Therefore, the contour determination unit 105 determines that the operational state of the machine is the abnormal state. If change of the sound pressure level of the characteristic frequency component is extremely fast, the contour determination unit 105 determines that the operational state of the machine is the abnormal state because rapid change of the sound pressure level cannot be seen in the normal operational state.

In step S507, if the sound pressure level calculated by the contour determination unit 105 does not change for a certain period, this means that the user may be required to stay there due to some reason (e.g., the user is in physically bad shape or the user found malfunction of the machine and is inspecting the machine), and therefore, this can be determined as any one of the machines and the user being in an abnormal state.

A specific example of observation operation of the monitoring apparatus according to the present embodiment will be explained in detail with reference to FIG. 6 and FIG. 7.

Figure 6:
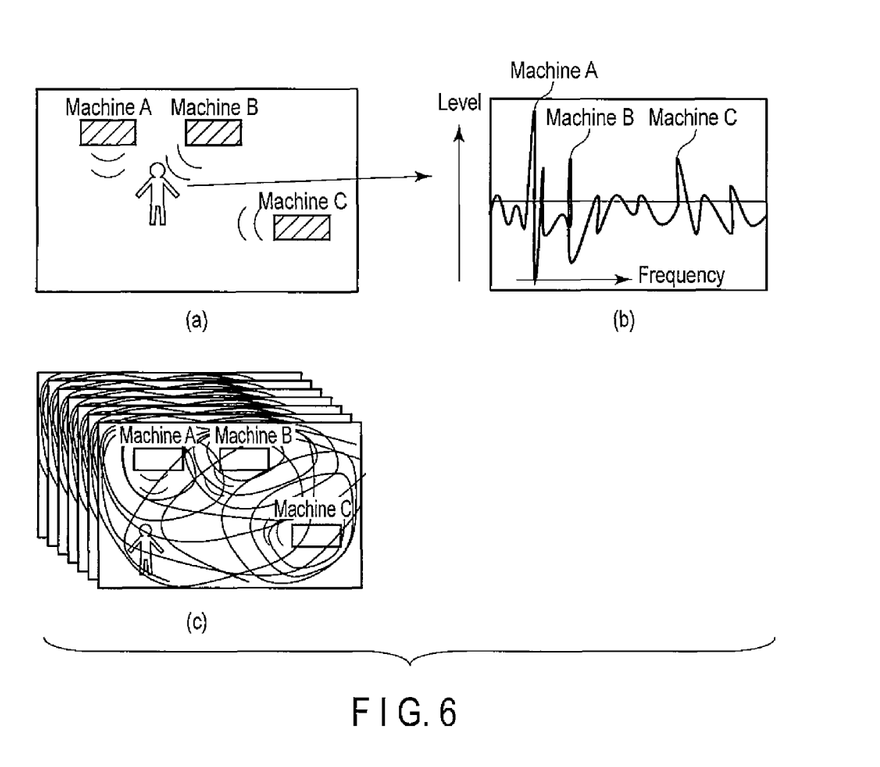
FIG. 6 is a diagram illustrating a specific example of the observation operation.
Figure 7:
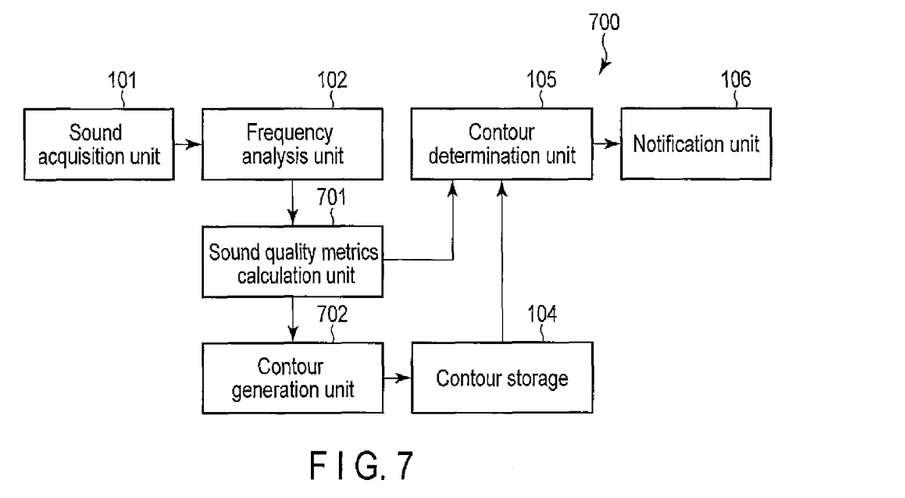
FIG. 7 is a block diagram illustrating a configuration of a monitoring apparatus according to a second embodiment.

It is assumed that the user observes at a position as shown in FIG. 6(a). A result obtained by observing environmental sound at the position of FIG. 6(a) and performing Fourier transformation is as shown in FIG. 6(b). The relationship between the characteristic frequency component and the sound pressure level as shown in FIG. 6(b) can be obtained, and the respective characteristic frequency components of machine A, machine B and machine C can be obtained. If such characteristic frequency components of the environmental sound are extracted by the frequency analysis unit 102 with sampling performed with a regular interval, it is possible to determine whether or not the sound pressure level of each characteristic frequency component changes, and whether or not there is a peak of sound pressure level at a frequency that is different from each characteristic frequency component.

Lastly, the sound pressure level of each characteristic frequency component observed is compared with the contour figures of the sound pressure level included in advance in the basic data items stored in the contour storage 104, and a determination is made as to whether or not there is any measuring point matching the sound pressure level of each characteristic frequency component observed in the contour figure as shown in FIG. 6(c).

According to the first embodiment as described above, a determination can be made as to whether the machines and the user are in the normal state or in the abnormal state, by comparing the sound pressure level of the environmental sound including the operating sound for each machine with the contour figures of the sound pressure level included in the basic data items.

Second Embodiment

The second embodiment is different from the first embodiment in that a sound quality metric is used as a parameter used for generation of a contour figure. The sound quality metrics is an index for determining the differences in the sound quality based on the concept of psychoacoustics. More specifically, for example, the sound quality metrics includes loudness which is an index representing the level of the sound, sharpness which is an index representing the pitch of the sound, roughness which is an index representing the roughness of the sound, and variation intensity which is an index representing the sense of change of the sound.

A monitoring apparatus according to the present embodiment will be explained in detail with reference to FIG. 7.

A monitoring apparatus 700 according to the present embodiment includes a sound acquisition unit 101, a frequency analysis unit 102, a contour storage 104, a contour determination unit 105, a notification unit 106, a sound quality metrics calculation unit 701, and a contour generation unit 702.

The sound acquisition unit 101, the frequency analysis unit 102, contour storage 104, the contour determination unit 105, and the notification unit 106 perform the same operations as those of the first embodiment. Therefore, explanation thereof is omitted.

The sound quality metrics calculation unit 701 receives the sound pressure level of the characteristic frequency component of each machine at the measuring point from the frequency analysis unit 102, and generates the sound quality metrics.

The contour generation unit 702 receives the sound quality metrics from the sound quality metrics calculation unit 701, and generates contour figures of the sound quality metrics for all the combinations of the machines, like the contour figures of the sound pressure levels in the first embodiment. In this case, contours of all the combinations of the machines are generated for a contour figure of loudness (which may be hereinafter referred to as a loudness contour figure) and a contour figure of sharpness (which may be hereinafter referred to as a sharpness contour figure).

Now, the operation of basic data generation by the monitoring apparatus according to the second embodiment will be explained in detail with reference to the flowchart of FIG. 8.

Figure 2:
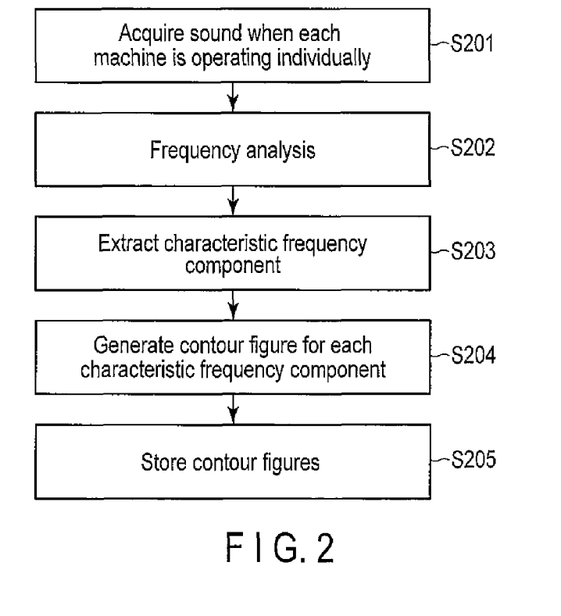
FIG. 2 is a flowchart illustrating operation of basic data generation by the monitoring apparatus according to the first embodiment.

In the processings from step S801 to step S803, the same processings as those from step S201 to step S203 as shown in FIG. 2 are performed.

In step S804, the sound quality metrics calculation unit 701 calculates the loudness based on the sound pressure level of the characteristic frequency component of each machine. The loudness can be calculated for each sound pressure by writing, into a chart, a result obtained from frequency analysis performed by the frequency analysis unit 102. Since this is a generally available method, explanation thereof is omitted.

Further, the sharpness, the roughness, the impulsiveness, and the change intensity are calculated from the loudness for each machine. The sharpness can be calculated from the barycenter of a size of an area of spectrum of the loudness. Since a generally available method may be used, detailed explanation thereof is omitted. The roughness can be calculated from periodical change of the level or the frequency of the sound in time-series. The change intensity and the roughness can also be obtained from the same calculation method. The roughness is an index representing the roughness of the sound sensitive to fast change at around 70 Hz. The change intensity is an index representing the sense of change sensitive to slow change at around 4 Hz. The impulsiveness represents the degree of impulse of the sound.

In step S805, the contour generation unit 103 generates a loudness contour figure and a sharpness contour figure for each of all the combinations of the machines like step S204.

In step S806, the contours generated by the contour generation unit 103 are stored to the contour storage 104. The operation of the basic data generation is finished here.

Subsequently, observation operation will be explained in detail with reference to the flowchart of FIG. 9.

Figure 8:
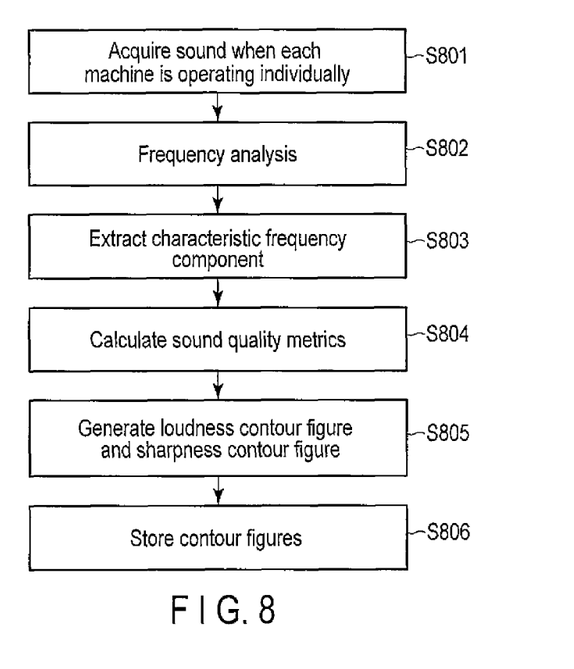
FIG. 8 is a flowchart illustrating operation of basic data generation by a monitoring apparatus according to the second embodiment.

The processings in step S901 and step S902 are the same processings as those in step S801 and step S802 as shown in FIG. 8.

In step S903, the sound quality metrics calculation unit 701 calculates the loudness of the characteristic frequency component for each machine. If change of the level of the loudness observed is greater than or equal to a threshold value, step S907 is performed. If the level of the loudness observed does not change for a certain period or more, step S908 is subsequently performed. In other cases, step S904 is subsequently performed.

In step S904, the sound quality metrics calculation unit 701 calculates the sharpness, the change intensity, the impulsiveness, and the roughness, based on the loudness calculated for each machine. If the levels of the sharpness, the change intensity, the impulsiveness, and the roughness do not change for a certain period or more, step S908 is performed. In other cases, step S905 is subsequently performed.

In step S905, the contour determination unit 105 respectively compares the loudness and the sharpness at each measuring point of the loudness contour figure and the sharpness contour figure stored in the contour storage 104 with the loudness and the sharpness calculated from the environmental sound. If there are a loudness contour figure and a sharpness contour figure including a measuring point at which the loudness and the sharpness match each other, step S906 is performed.

In step S906, the contour determination unit 105 determines that the operational state of the machine is the normal state.

In step S907, the contour determination unit 105 determines that the operational state of the machine is the abnormal state.

In step S908, like step S507, the contour determination unit 105 determines that at least one of the machines and the user is in the abnormal state.

Figure 9:
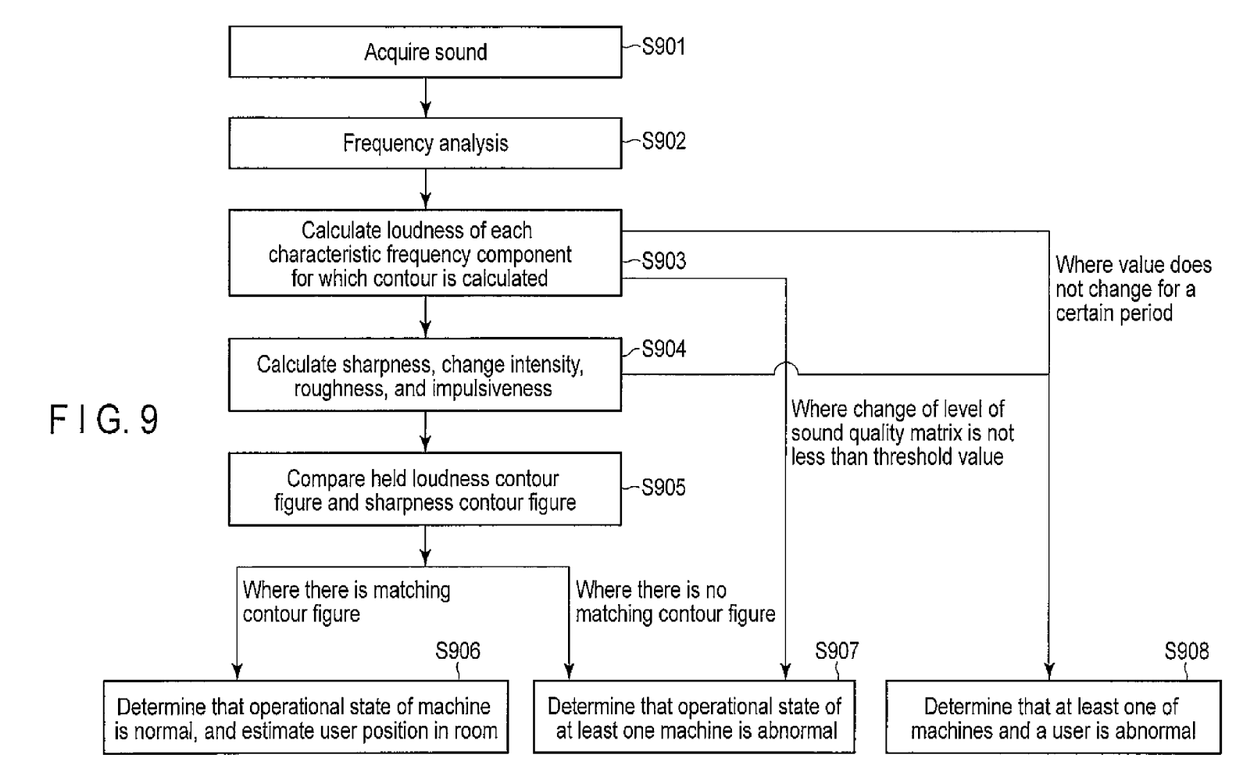
FIG. 9 is a flowchart illustrating observation operation of the monitoring apparatus according to the second embodiment.

Although the observation operation as shown in FIG. 9 uses only the sharpness contour figure and the loudness contour figure, the same determination can be made upon generating a contour figure of another sound quality metrics. For example, the contour generation unit 103 may generate a roughness contour figure, a change intensity contour figure, and an impulsiveness contour figure, and the contour determination unit 105 may make the same determination as that made with the sharpness contour figure and the loudness contour figure.

In the present second embodiment, the operational state of the machine is determined by determining whether or not the sharpness and the loudness calculated from the environmental sound match the sharpness contour figure and the loudness contour figure stored in the contour storage 104, and on that occasion, the state of the machine can be found in more detail by measuring the levels of the loudness and the sharpness. For example, if the loudness increases, the operational state of the machine is expected to be unbalanced, and if the sharpness increases, this indicates increase of a high frequency component. In such cases, there may be an abnormality in a bearing of a machine, or a rotational unit such as a fan may be in contact with a wall. Further, another sound quality metrics may be used to find the state of a machine in more detail. For example, if the roughness increases, a slide unit is expected to be in unstable state, and if the change intensity increases, it is expected that there may be an abnormality in rotation of a motor. Further, if the impulsiveness increases, occurrence of an abrupt abnormal phenomenon can be expected.

In this case, an example of health monitoring of a user and a machine will be explained in detail with reference to FIG. 10.

Figure 10:
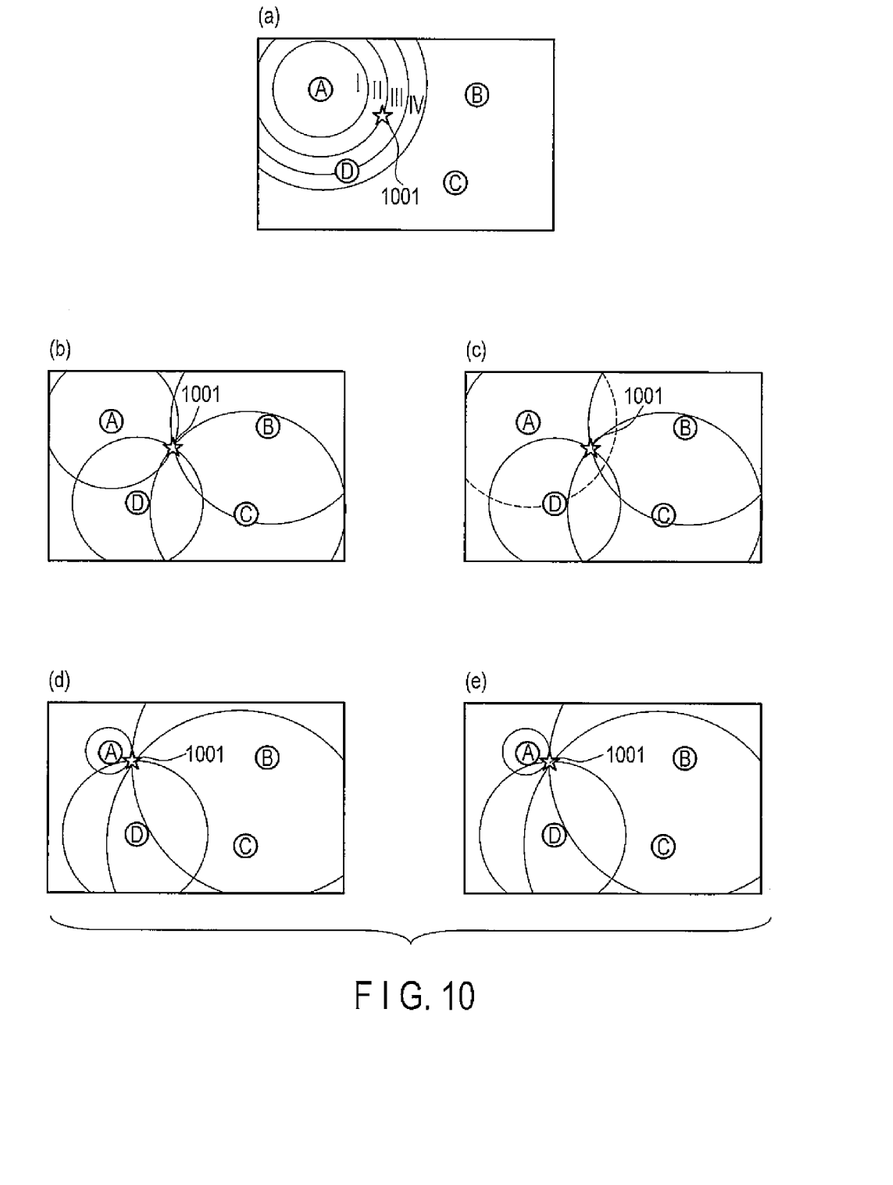
FIG. 10 is a diagram illustrating an example of health monitoring.

FIG. 10(a) illustrates a contour of a sound pressure level of a frequency $f_A$ component generated by a machine A. A star mark indicates a location where a user 1001 is located. For the sake of simplicity, the contour of the sound pressure level is shown without considering reflections by walls. It is assumed that the contour of the sound pressure level has already been measured, analyzed, and evaluated. FIG. 10(a) illustrates a user 1001 listening to sound of sound pressure level 2 of a frequency $f_A$ component generated by the machine A.

FIG. 10(b) illustrates the same sound pressure level lines of characteristic frequency components $f_A$, $f_B$, $f_C$, and $f_D$ generated by a machine A, a machine B, a machine C, and a machine D, respectively, if all the machines are operating normally. The position where the user 1001 is located can be estimated from information about the same sound pressure level lines of different characteristic frequencies of the plurality of machines. Further, movement of the user 1001 also can be estimated by increasing the sampling speed.

FIG. 10(c) is a case where the machine A is in the abnormal state. If a particular machine is abnormal, only the sound pressure level and quality metrics corresponding to the abnormal machine is different even though the user 1001 is located at a position matching the contour of the sound pressure level of another machine, and therefore, the machine can be determined to be abnormal. FIG. 10(d) shows a case where the user 1001 is in proximity to the machine A and is normal. FIG. 10(e) shows a case where the user 1001 is in proximity to the machine A and is in an abnormal state. If the observed sound pressure level does not change for a certain period, it is possible to determine that a particular machine is abnormal and the user 1001 cannot move away from the machine, or the user 1001 is abnormal in some respects.

According to the second embodiment as described above, the measured machine is observed with the sound quality metrics, so that if an abnormality in the machine is found, the abnormal state can be found in more detail.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitoring apparatus, comprising:
an acquisition unit configured to acquire an environmental sound in measurement points within a space in which one or more machines to be measured are present to produce an environmental sound signal;
an analysis unit configured to perform frequency analysis by sampling the environmental sound signal, to extract characteristic frequency components of the machines, each of the characteristic frequency components being a frequency component with the highest sound pressure level in frequency components included in operating sounds of the machines;

a calculation unit configured to calculate a first value of metrics in the measurement points based on the sound pressure levels of the characteristic frequency components, the metrics indicating at least one index for determining difference of sound quality;

a storage to store contour data items generated by connecting a second value of the metrics in the measurement points, the second values being pre-calculated according to an operational state of the machines; and a determination unit configured to determine whether or not there is a first measurement point in which the first value and the second value match, if there is the first measurement point and change of the first value is less than a threshold value, determine that the operational state of the machines is normal, if there is no first measurement point or the change is not less than the threshold value, determine that the operational state of at least one of the machines is abnormal, and if the first value stays constant for a certain period, determine that at least one of a user and the machines is abnormal in status.

2. The apparatus according to claim 1, wherein the calculation unit calculates loudness and sharpness as the metrics.

3. The apparatus according to claim 2, wherein the calculation unit further calculates roughness, variation intensity and impulsiveness as the metrics.

4. A monitoring apparatus, comprising:

an acquisition unit configured to acquire an environmental sound in measurement points within a space in which one or more machines to be measured are present to produce an environmental sound signal;

an analysis unit configured to perform frequency analysis by sampling the environmental sound signal, to extract characteristic frequency components of the machines, each of the characteristic frequency components being a frequency component with the highest sound pressure level in frequency components included in operating sounds of the machines, and to obtain a first value of the sound pressure level in the measurement points;

a storage to store contour data items generated by connecting a second value of the sound pressure level in the measurement points, the second value being pre-calculated according to an operational state of the machines; and a determination unit configured to determine whether or not there is a first measurement point in which the first value and the second value match, if there is the first measurement point and change of the first value is less than a threshold value, determine that the operational state of the machines is normal, if there is no first measurement point or the change is not less than the threshold value, determine that the operational state of at least one of the machines is abnormal, and if the first value stays constant for a certain period, determine that at least one of a user and the machines is abnormal in status.

5. A monitoring method, comprising:

acquiring an environmental sound in measurement points within a space in which one or more machines to be measured are present to produce an environmental sound signal;

performing frequency analysis by sampling the environmental sound signal, to extract characteristic frequency components of the machines, each of the characteristic frequency components being a frequency component with the highest sound pressure level in frequency components included in operating sounds of the machines;

calculating a first value of metrics in the measurement points based on the sound pressure levels of the characteristic frequency components, the metrics indicating at least one index for determining difference of sound quality;

storing, in a storage, contour data items generated by connecting a second value of the metrics in the measurement points, the second values being pre-calculated according to operational states of the machines; and determining whether or not there is a first measurement point in which the first value and the second value match, if there is the first measurement point and change of the first value is less than a threshold value, determining that the operational state of the machines is normal, if there is no first measurement point or the change is not less than the threshold value, determining that the operational state of at least one of the machines is abnormal, and if the first value stays constant for a certain period, determining that at least one of a user and the machines is abnormal in status.

6. The method according to claim 5, wherein the calculating the first value calculates loudness and sharpness as the metrics.

7. The method according to claim 6, wherein the calculating the first value further calculates roughness, variation intensity and impulsiveness as the metrics.

* * * * *